May 25, 1948. G. F. WOMBLE Re. 23,004

CONTINUOUS DYEING OF TEXTILE MATERIALS

Original Filed Oct. 21, 1943

INVENTOR.
Glenn F. Womble
BY
Barnes, Kisselle, Raisch & Choate
Attorneys

Reissued May 25, 1948 Re. 23,004

UNITED STATES PATENT OFFICE 23,004

CONTINUOUS DYEING OF TEXTILE MATERIALS

Glenn F. Womble, Danville, Va., assignor to Dan River Mills, Incorporated, a corporation of Virginia Original No. 2,396,908, dated March 19, 1946, Serial No. 507,211, October 21, 1943. Application for reissue March 15, 1947, Serial No. 734,894

6 Claims. (Cl. 8—151)

This invention relates to the process of continuous dyeing of textile materials with vat dyestuffs.

The object of the invention is to provide a rapid economical and continuous method of vat dyeing, obtaining results comparable in depth of shade, fastness properties and appearance, to the products of the old and well known pigment-pad method, a two step process commonly used in the practice of dyeing vat colors of medium and heavy shades.

Dyeing with "vat" dyestuffs is accomplished by reducing them chemically by a suitable reducing agent such as sodium hydrosulphite, to the leuco condition and dissolving them by means of a suitable alkali such as sodium hydroxide (commonly known as caustic soda). In this condition they are taken up by the affinity of the various fibers constituting the material, rinsed with water and subsequently oxidized by the oxygen of the air, or chemical oxidizing agents such as sodium perborate, sodium bichromate, and acetic acid, hydrogen peroxide, and numerous others; rinsed again and usually soaped to remove any loose particles of dyestuff, to develop the shade, and increase the fastness properties and given a final rinsing with water to remove the soap.

The usual methods of dyeing vat colors on piece goods are "straight jig," "pigment-pad jig," and "continuous" dyeing.

In "straight-jig" dyeing, the reduced and dissolved color is added to a bath containing the necessary amounts of reducing and dissolving chemicals contained in a rectangular trough, on which two rollers, which may be revolved around the longitudinal axis with corresponding driving and braking arrangements, are fixed. The fabric, which is provided at both ends with end cloths, is wound in the open width in a stretched condition onto one of these rollers which is fixed above the jig. For the purpose of dyeing, the fabric is alternately wound off one roller (delivery roller), in the open width and in a stretched condition, passed through the dye-liquor by means of two or three guide rollers which are fixed in the jig and wound on to the other roller (receiving roller). Four to eight of such passages of the material are necessary to accomplish the desired shade. By similar passages of the material through a rinse, oxidizing bath, soaping bath, and a final rinse, the dyeing operation is completed. The average jig will produce approximately five hundred to one thousand yards in four hours.

In "pigment-pad jig" dyeing, the dry undyed material is impregnated in the open width with a dispersion of vat pigment, i. e., undissolved color in water, from a stock tank and passed through a padder, i. e., squeezed through two rubber covered rollers or a metal roller and a rubber covered roller with the bottom roller being driven, thus delivering the material to a batching arrangement which rolls up the material on a wooden shell or core in the form of a "jig-roll" which in turn is loaded on the jig. The jig bath or rectangular box before mentioned in describing "straight-jig" dyeing, is charged with the necessary reducing and dissolving chemicals and from this step on the process is identical with "straight-jig" dyeing.

In "continuous" vat dyeing (as heretofore practiced) the dry undyed material is fed through a padder as described under "pigment-pad" dyeing, but instead of being impregnated with a dispersion of pigment in water, the dyestuff is previously dissolved with the usual caustic soda (or other alkalis) and reducing agents, usually sodium hydrosulphite and fed to the padder from a stock tank. Then in order to complete the dyeing which requires time, the material is passed through a booster box or boxes, containing rollers arranged to allow goods to remain in them from thirty seconds to five minutes, depending on depth of shade desired, which is, or are, charged with the quantity of dissolved dyestuff necessary to sustain the depth of shade afforded by the stock feed, and the necessary amounts of alkali and reducing agents; then through rinsing, oxidizing, rinsing, soaping and rinsing box or boxes respectively, the material being held in the open width during the entire operation.

Some of the disadvantages of previous mentioned methods are:

1. In dyeing by the "straight-jig" method, a few yards of lead line, or end cloths, have to be sewn to each end of the "jig roll" to protect the good cloth from too much exposure in the dye bath while reversing same. The material always suffers from improper penetration, leaving the dyestuff precipitated on the surface, giving a very undesirable appearance and inferior fastness properties. Because of the dyestuffs being added at intervals, and the fact that in a combination of dyestuffs, the affinity of the individual dyestuffs usually vary widely, the shading as a rule is bad. When the dyeing operation is finished, there is always a sizeable amount of color and chemicals left over that cannot be used again and is lost. Too, there is quite a bit of unnecessary labor involved and time consumed as compared to continuous dyeing.

2. In dyeing by the "pigment-pad" method, the fastness properties and appearance of the finished goods are satisfactory, but it is a two step method, which consumes too much time and labor, has dyestuff and chemicals left over to be dumped down the drain, and usually bad shading properties. As in the case of "straight-jig" dyeing, end cloths have to be sewn on and at the end of the operation removed, an operation expensive in wasted material and labor.

3. The most recent method, "continuous vat dyeing," is far more economical from the cost standpoint, i. e. cost of chemicals and dyestuffs, labor involved and shading properties. But the depth of shade economically obtainable at a reasonable cost, the requisite fastness properties, the desirable solid or smooth appearance of the material are all limited to light or at most medium shades.

The depth of shade obviously depends upon the concentration of the feeding liquor stored in a stock tank or tanks. Heretofore, the dyestuff was dissolved in the stock tank or before being added to the stock tank, and applied to the textile in the dissolved condition. The concentration and consequently the depth of shade is limited by the solubility of the particular dyestuff in question. Furthermore even if the dyestuff is sufficiently soluble, a high concentration cannot be used as it requires more time than is available for the dyestuff to be absorbed by the textile material with the result that the unabsorbed portion is washed off in the booster and rinse boxes.

Furthermore, nearly all vat dyestuffs are unstable in solution and break down more or less rapidly on standing. If for any reason the continuous operation is interrupted for any considerable length of time the reduced and dissolved dyestuff in the feed tank must be thrown away and a new lot made up. Finally, it is quite impossible to foresee the exact amount of dyestuff which must be reduced and dissolved for a given lot of textile material. Any excess dye solution must be thrown away. Due to the fact that the stability of a reduced vat solution is influenced by the temperature at which it is maintained and the length of time it is held in solution before using, frequently there are large quantities of expensive dyestuffs lost due to delays which are inevitable when a shade is being matched for the first time.

In the processes contemplated by the present invention, there is a continuous dyeing of textile materials with vat dyestuffs which are applied in the form of a water dispersion of the pigment and dried or semi-dried to fix the pigment on and within the fabric. The pigment is subsequently "reduced," that is, dissolved in the common caustic alkali and reducing agents such as sodium hydrosulphite, and precipitated by oxidation on or in the fibers, all in one operation.

Figures 1A, 1B:
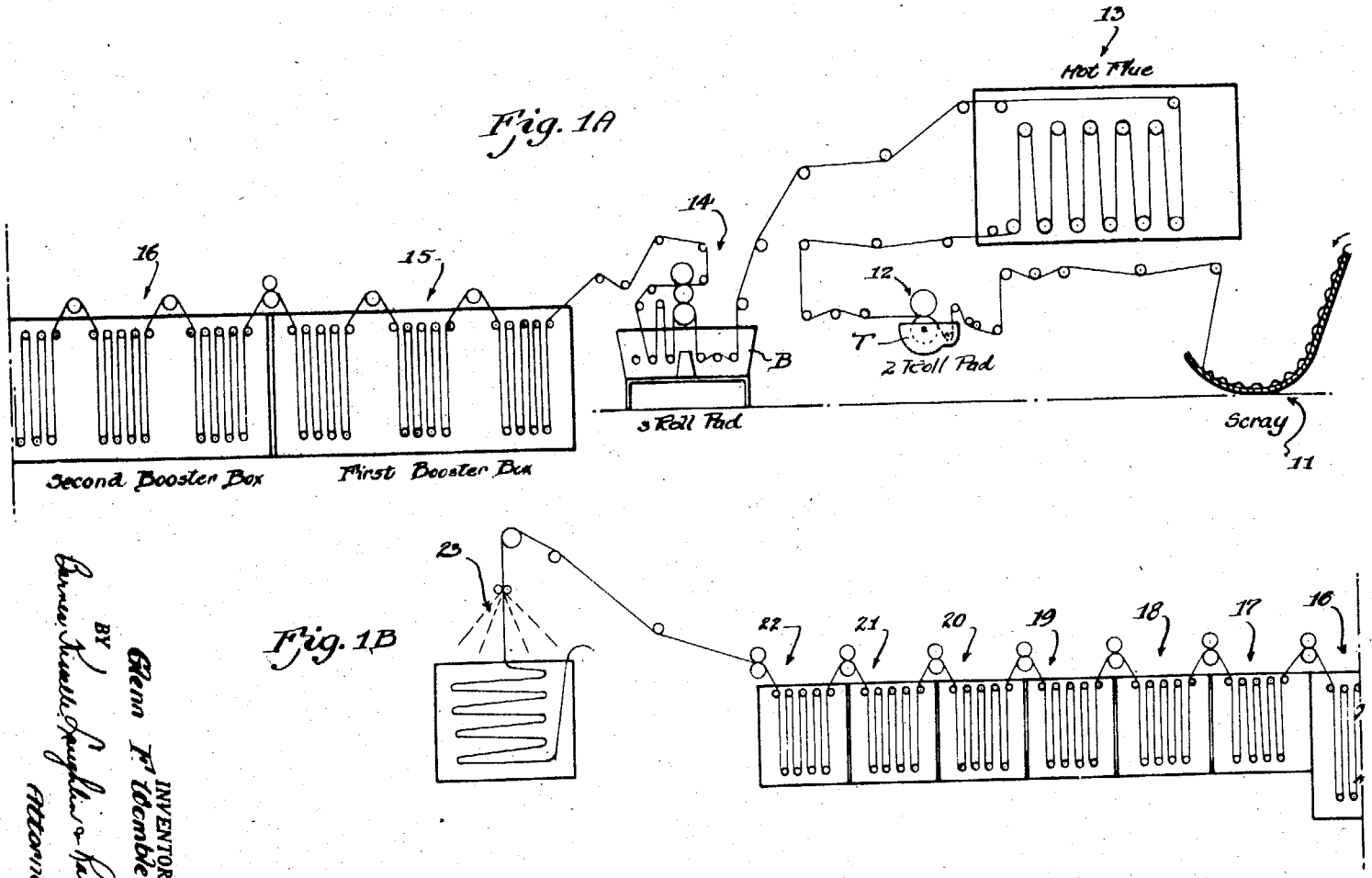
Fig. 1A is a line diagram of a portion of the dyeing circuit.
Fig. 1B shows the end of this circuit.

By the novel method herein described of a continuous pigment padding of the material and a subsequent drying or semi-drying, and developing in one operation, this invention overcomes the disadvantages listed in the foregoing methods. Also it enables the dyer to salvage any quantity of stock solution left over.

In accordance with the present process the vat colors are applied in pigment form dispersed or suspended in water. This is done by a two roll padder which has an immersion box T and which is indicated generally at 12. As previously described a padder consists of two rubber covered rollers or a metal roller and a rubber covered roller with the bottom roller being driven. The material is fed to the padder 12 from a scray 11. The immersion box T is supplied with the pigment in proper suspension in water. As the material passes through the rolls of padder 12, it is squeezed to the point that the moisture retained is reduced to from 50 to 75% of the weight of the fabric. It is then passed through a dryer or hot flue 13 such as the Andrews-Goodrich type of dryer.

It has been found that in applying the vat colors in this way the pigment is evenly distributed since the pigment itself has little or no affinity for the neps, that is, the distribution is not affected by the thick or thin places or other irregularities that might be present and later cause disagreeable effects in the finished goods.

With the pigment applied in this way it can be rapidly dissolved and dyed simultaneously. This dissolving and dyeing is preferably accomplished through a three roller padder 14 arranged in tandem with booster boxes 15 and 16 which also contain reducing and dissolving chemicals.

The immersion box B of padder 14 holds the reducing and dissolving chemicals for the padder 14. One or more of the booster boxes 15 and 16 can be used depending on the time required for fixing the particular dye. The three roller padder arrangement is preferably in conjunction with the booster boxes since the extra squeezes to which the cloth is subjected cause better penetration of the goods. It is found that only a short time, usually from one to two minutes, is needed to dissolve and develop the shade. This is probably due to the fact that previous drying has driven off the water used in applying the pigment, thus leaving the material in a condition in which it will quickly absorb the solution of caustic alkalis and reducing agents. Furthermore, the vat pigment is left after drying in a condition in which the maximum amount of surface area is exposed and it is already heated to or above the reducing temperature, thus facilitating rapid solution and dyeing action.

After passing rapidly through the reducing bath, that is, consuming only the time usually necessary for pastel shades dyed by regular methods, the dyed material is rinsed, oxidized, soaped, if necessary, and rinsed according to facilities available for usual practice of continuous vat dyeing.

The pleasing and unexpected results found are:

(1) The ability to reduce (or dissolve) and dye simultaneously and continuously at rates of speed comparable to the usual methods for dyeing light shades.

(2) Production of medium and heavy shades having a smooth appearance free from the usual disagreeable heavy dyed neps and irregular surface deposits which are usually present as a result of trying to dye same shades by the usual reduced pad continuous dyeing methods. This process is especially adapted to the use on heavy and closely woven goods such as "Windbreaker" poplins and heavy twills of the types used for army wear, allowing unusual speeds of one hundred yards or more per minute.

(3) Ability to obtain fastness properties comparable to the slow and expensive pad-jig dyed fabrics.

Examples of continuous pigment vat dyeing:

*Example 1*

Mercerized bleached cotton "majestic" poplin which weighs .36 lb. per yard is dyed a medium shade of vat khaki at the rate of 100 yards per minute on a continuous dyeing machine by the following procedure:

Pigment padded on two roll pad 12 with a feed liquor of 1.49 oz. per gal. Indanthrene Brown BRA paste, .926 oz. per gal. Calcoloid Yellow GCD paste and .29 oz. per gal. Calcoloid Grey BD paste; passed through hot flue 13 (thereby dried); through three roll pad 14 containing requisite quantities of reducing and dissolving chemicals; through first booster box 15 containing reducing and dissolving chemicals; skip second booster box 16; rinsed; soaped and rinsed through remaining wash boxes 17 to 22 and finally folded into box 23.

Indanthrene Brown BRA is listed in the AATCC year book as Pr. 118; Calcoloid Yellow GCD has a color index 1095; Calcoloid Grey BD is a product of the Calco Chemical Company.

*Example 2*

Mercerized boiled out cotton "wind resistant" poplin as specified by U. S. Government is dyed vat olive drab at the rate of 90 yards per minute on same continuous vat dyeing machine as used in Example 1 as follows:

Pigment padded on two roll pad 12 with a feed liquor containing 2.16 ozs. per gallon Ponsol Brown AGG double paste, 2.26 ozs. per gallon Ponsol Olive GGL paste and 1.02 ozs. per gallon Ponsol Golden Orange 4G paste; passed through hot flue 13 and semi-dried; through three roll pad 14 containing requisite quantities of reducing and dissolving chemicals; through first and second booster boxes 15 and 16; through rinse, oxidizing, soap, hot wash and rinse boxes 16 to 22 thereby completing the dyeing operation.

Ponsol Brown AGG, Ponsol Olive GGL, and Ponsol Golden Orange 4G are products of the E. I. du Pont de Nemours & Co., Inc.

*Example 3*

Mercerized boiled out cotton herringbone twill as specified by U. S. Government is dyed continuously, the vat O. D. No. 7 shade at the rate of 80 yards per minute on the same machine as Example 2 by padding the following vat pigments on two roll pad 12:

| | Ounces |
|---|---|
| Indanthrene Olive TA paste | 4.34 |
| Carbanthrene Khaki 2G paste | 5.84 |
| Indanthrene Olive Green BA paste | 1.63 |

Indanthrene Olive TA is a product of General Aniline Works and is sold by General Dye Corporation; Carbanthrene Khaki 2G and Indanthrene Olive Green BA are listed in AATCC year book as Pr. 122 and 293, respectively.

After semi-drying the material through hot flue 13, the subsequent steps in dyeing are identical to operation in Example 2.

Throughout this application all the processes are described as applied to conventional piece goods of standard width. However, this invention is applicable to narrow width goods and also single yarns and cords. Therefore, the word "fabric" or "textile" as used in this application is defined as including not only wide and narrow fabrics, but also single yarns and cords.

I claim:

1. Those steps in the method of continuous vat dyeing solid colors on textile materials which comprise applying to the textile a pigment from an unthickened water suspension or dispersion, removing the water by squeezing and heating to leave the pigment in the textile, and immediately subjecting the textile previously dried by heating to an alkaline reducing agent, and squeezing said fabric to obtain penetration of said reducing agent and contact with the pigments in the fabric.

2. Those steps in the method of solid color dyeing of one continuous piece of textile material in one operation with vat dyestuffs, which comprise applying to the textile a fluid, unthickened, water dispersion of pigment, squeezing and drying by heating to remove a substantial portion of the water from the textile during movement of the textile without disturbing the pigment on the textile, immediately subjecting the heat dried textile for a relatively short period of time to an alkaline reducing bath maintained at substantially constant and relatively high concentration, and then subjecting the continuous length of textile to a squeezing action after such reducing bath to obtain thorough penetration of said reducing agent and contact with the pigments in the fabric.

3. Those steps in the method of continuous dyeing solid colors on textile materials with vat dyestuffs which comprise applying to the textile an unthickened water dispersion of vat pigment, subjecting the textile to a uniform squeezing action, drying by heating the textile, immediately subjecting the heat dried textile to a bath of reducing and dissolving chemicals, squeezing said chemicals onto the pigment treated cloth to initiate the action between the fiber and the dyestuff, and then subjecting said cloth to one or more baths of reducing and dissolving chemicals.

4. In a continuous dyeing process for vat dyeing solid colors on a continuous piece of textile material, those steps which include dispersing throughout the fabric vat dye pigments from the unthickened aqueous suspension, removing the greater portion of such liquid by squeezing, and then drying by heating, immediately thereafter but only for a relatively short period of time subjecting such heated fabric to one or more baths of an alkaline reducing agent, the heat in said fabric assisting in maintaining the temperature of the alkaline reducing agent, and squeezing said fabric to obtain penetration of said alkaline reducing agent and contact with the dry pigments in the fabric.

5. In a continuous dyeing process for vat dyeing solid colors on a continuous piece of textile material, those steps which include dispersing throughout the fabric vat dye pigments from an unthickened water suspension, removing the great portion of said liquid by squeezing so that the moisture retained is reduced to less than 75% of the weight of the fabric, and then drying by heating, and immediately but for only a relatively short period of time subjecting the continuously moving heat dried fabric to one or more baths of an alkaline reducing agent maintained at substantially constant and relatively high concentration, the speed of movement of said dry fabric into and through said high concentration bath being at the rate of over fifty yards per minute.

6. Those steps in the method of dyeing solid colors on one continuous piece of textile material in one operation with vat dyestuffs which comprise, dispersing throughout the textile vat pigments from an unthickened aqueous suspension, removing a substantial portion of the liquid by squeezing, and then drying by heating, and continuing the movement of the textile immediately through a bath of an alkaline reducing agent of constant and relatively high concentration, the heat of the fabric assisting in maintaining the temperature of said bath, the developing of the shade of the textile before rinsing requiring approximately two minutes or less.

GLENN F. WOMBLE.

REFERENCES CITED

The following references are of record in the file of this patent:

UNITED STATES PATENTS

| Number | Name | Date |
|---|---|---|
| 893,384 | Schlegel | July 14, 1908 |
| 1,431,136 | Villiger et al. | Oct. 3, 1922 |
| 1,712,044 | Macadam | May 7, 1929 |
| 1,979,818 | Baker | Nov. 6, 1934 |
| 2,164,930 | Lubs | July 4, 1939 |
| 2,199,233 | Williams | Apr. 30, 1940 |
| 2,204,839 | Wedler | June 18, 1940 |
| 2,364,838 | Williams | Dec. 12, 1944 |

OTHER REFERENCES

Amer. Dyestuff Reporter, Nov. 15, 1937, pages 691 to 694.